United States Patent
Feng (10) Patent No.: US 11,166,149 B2
(45) Date of Patent: Nov. 2, 2021

(54) DEVICE-TO-DEVICE COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 30 days.

(21) Appl. No.: 16/066,275

(22) PCT Filed: Mar. 28, 2016

(86) PCT No.: PCT/CN2016/077511
§ 371 (c)(1),
(2) Date: Jun. 26, 2018

(87) PCT Pub. No.: WO2017/166021
PCT Pub. Date: Oct. 5, 2017

(65) Prior Publication Data
US 2020/0015068 A1 Jan. 9, 2020

(51) Int. Cl.
*H04W 8/18* (2009.01)
*H04L 12/18* (2006.01)
(Continued)

(52) U.S. Cl.
CPC .......... *H04W 8/183* (2013.01); *H04L 12/185* (2013.01); *H04W 8/005* (2013.01); *H04W 8/24* (2013.01);
(Continued)

(58) Field of Classification Search
CPC ... H04W 8/183; H04W 72/048; H04W 8/005; H04W 8/24; H04W 64/006; H04W 76/10;
(Continued)

(56) References Cited

U.S. PATENT DOCUMENTS 9,615,354 B2 * 4/2017 Hooli .................... H04W 72/04
10,334,563 B2 * 6/2019 Chen .................... H04W 8/005
(Continued)

FOREIGN PATENT DOCUMENTS

CN 1747566 A 3/2006
CN 102714890 A 10/2012
(Continued)

OTHER PUBLICATIONS

International Search Report in international application No. PCT/CN2016/077511, dated Jan. 3, 2017.
(Continued)

*Primary Examiner* — Christopher P Grey
(74) *Attorney, Agent, or Firm* — Ladas & Parry, LLP (57) ABSTRACT

Provided in an embodiment of the invention are a device-to-device communication method, a terminal device, and a network device. The method comprises: a first terminal acquires attribute information of a second terminal according to subscription information of the second terminal, or according to at least one field of an Identifier of the second terminal; and the first terminal communicates with the second terminal according to the attribute information of the second terminal. The embodiment of the invention can increase a probability of successful data transmission.

11 Claims, 4 Drawing Sheets

(51) Int. Cl.
*H04W 8/00* (2009.01)
*H04W 8/24* (2009.01)
*H04W 64/00* (2009.01)
*H04W 72/04* (2009.01)

(52) U.S. Cl.
CPC ....... *H04W 64/006* (2013.01); *H04W 72/048* (2013.01)

(58) Field of Classification Search
CPC ... H04W 76/11; H04W 8/20; H04W 28/0226; H04L 12/185
See application file for complete search history.

(56) References Cited

U.S. PATENT DOCUMENTS

| | | | |
|---|---|---|---|
| 2011/0134827 | A1 | 6/2011 | Juhani |
| 2014/0198637 | A1 | 7/2014 | Shan et al. |
| 2014/0206348 | A1 | 7/2014 | Kerstin |
| 2014/0237125 | A1 | 8/2014 | Zhou et al. |
| 2014/0274066 | A1 | 9/2014 | Gabor |
| 2015/0201452 | A1 | 7/2015 | Wang et al. |
| 2015/0215028 | A1* | 7/2015 | Ljung ............... H04W 88/04 370/315 |
| 2016/0150390 | A1* | 5/2016 | Chen ................ H04W 48/16 370/311 |
| 2017/0223725 | A1* | 8/2017 | Xiong ............... H04L 5/0053 |
| 2017/0245243 | A1* | 8/2017 | Siomina ............ H04W 76/14 |
| 2018/0139681 | A1* | 5/2018 | Jung ................. H04W 56/0015 |
| 2018/0175929 | A1* | 6/2018 | Wang ................ H04W 76/14 |
| 2018/0295534 | A1* | 10/2018 | Huang .............. H04W 76/23 |
| 2019/0036595 | A1* | 1/2019 | Ohtsuji ............. H04W 40/12 |
| 2020/0015297 | A1* | 1/2020 | Feng ................. H04W 8/24 |

FOREIGN PATENT DOCUMENTS

| | | |
|---|---|---|
| CN | 103096502 A | 5/2013 |
| CN | 103581890 A | 2/2014 |
| CN | 103701563 A | 4/2014 |
| CN | 104838697 A | 8/2015 |
| EP | 2770795 A1 | 8/2014 |
| JP | 2016521514 A | 7/2016 |
| WO | 2010006649 A1 | 1/2010 |
| WO | WO-2010006649 A1 * | 1/2010 .......... H04W 72/048 |
| WO | 2013055271 A1 | 4/2013 |
| WO | WO-2013055271 A1 * | 4/2013 ............ H04W 24/02 |
| WO | 2014176079 A1 | 10/2014 |
| WO | 2014185649 A1 | 11/2014 |
| WO | 2014186959 A1 | 11/2014 |
| WO | 2015045860 A1 | 4/2015 |
| WO | 2015161442 A1 | 10/2015 |
| WO | 2016018469 A1 | 2/2016 |
| WO | 2016028204 A1 | 2/2016 |

OTHER PUBLICATIONS

The Written Opinion of the International Search Authority in international application No. PCT/CN2016/077511, dated Jan. 3, 2017.
First Office Action of the Japanese application No. 2018-536159, dated Dec. 20, 2019.
Extended European Search Report in the European application No. 16895802.3, dated Sep. 19, 2019.
3GPP TS 23.303 V13.2.0 (Dec. 2015), 3rd Generation Partnership Project; Technical Specification Group Services and System Aspects; Proximity-based services (ProSe) Stage 2 (Release 13).
3GPP TS 36.306 V13.0.0 (Dec. 2015), 3rd Generation Partnership Project; Technical Specification Group Radio Access Network; Evolved Universal Terrestrial Radio Access (E-UTRA); User Equipment (UE) radio access capabilities (Release 13).
First Office Action of the Chinese application No. 201680077204.2, dated May 25, 2020, with search report.
First Office Action of the Indian application No. 201817030000, dated Jun. 9, 2020.
Decision of Refusal of the Japanese application No. 2018-536159, dated Jul. 28, 2020.
First Office Action of the Taiwanese application No. 106110250, dated May 12, 2020.
Second Office Action of the Taiwanese application No. 106110250, dated Jul. 23, 2020.
Second Office Action of the Chinese application No. 201680077204.2, dated Jan. 4, 2021.
Decision of Refusal of the Chinese application No. 201680077204.2, dated May 8, 2021.
First Office Action of the European application No. 16895802.3, dated Jun. 21, 2021.

* cited by examiner

A first terminal acquires attribute information of a second terminal according to subscription information of the second terminal or according to at least one field in an ID of the second terminal — 210

The first terminal performs communication with the second terminal according to the attribute information of the second terminal — 220

DEVICE-TO-DEVICE COMMUNICATION METHOD, TERMINAL DEVICE, AND NETWORK DEVICE

RELATED APPLICATION

This application is an application under 35 U.S.C. 371 of International Application No. PCT/CN2016/077511 filed on Mar. 28, 2016, the entire contents of which are incorporated herein by reference.

TECHNICAL FIELD

Embodiments of the present disclosure relate to the field of communications, and more particularly to a Device-to-Device (D2D) communication method, a terminal device and a network device.

BACKGROUND

D2D technology refers to a method that neighboring terminals may perform data transmission through a direct link in a short-distance range without a forwarding operation of a network device.

The D2D technology is a D2D technology capable of sharing a licensed frequency band resource with a cellular system to form a unified hybrid cellular and D2D network.

During D2D communication, communication between terminals may be implemented without scheduling of the network device, which may easily cause a data transmission failure. Therefore, there is an urgent need for a communication method to improve a success rate of D2D communication.

SUMMARY

The embodiments of the disclosure provide a D2D communication method, a terminal device and a network device, which may increase a success rate of data transmission.

A first aspect provides a D2D communication method, which may include that: a first terminal acquires attribute information of a second terminal according to subscription information of the second terminal or according to at least one field in an, Identifier (ID) of the second terminal; and the first terminal performs communication with the second terminal according to the attribute information of the second terminal.

In combination with the first aspect, in a first possible implementation mode of the first aspect, the attribute information of the second terminal may include first capability information of the second terminal, the first capability information may be capability information of the second terminal to communicate with the first terminal, and the operation that the first terminal performs communication with the second terminal may include that: the first terminal performs communication with the second terminal on the basis of the first capability information.

In combination with the first aspect or any abovementioned possible implementation mode, in a second possible implementation mode of the first aspect, the attribute information of the second terminal may include second capability information of the second terminal, the second capability information may be capability information of the second terminal to communicate with a network device, and the operation that the first terminal performs communication with the second terminal may include that: the first terminal determines first capability information of the second terminal on the basis of the second capability information, wherein the first capability information is capability information of the second terminal to communicate with the first terminal; and the first terminal performs communication with the second terminal on the basis of the first capability information.

In combination with the first aspect or any abovementioned possible implementation mode, in a third possible implementation mode of the first aspect, the first capability information may include at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

In combination with the first aspect or any abovementioned possible implementation mode, in a fourth possible implementation mode of the first aspect, before the operation that the attribute information of the second terminal is acquired, the method may further include that: terminals capable of communicating with the first terminal are acquired according to subscription information of multiple terminals; and the second terminal is determined from the terminals capable of communicating with the first terminal.

In combination with the first aspect or any abovementioned possible implementation mode, in a fifth possible implementation mode of the first aspect, the operation that the terminals capable of communicating with the first terminal are acquired may include that: a present location of the first terminal is acquired; and terminals capable of communicating with the first terminal at the present location are acquired according to the subscription information of the multiple terminals.

In combination with the first aspect or any abovementioned possible implementation mode, in a sixth possible implementation mode of the first aspect, the terminals capable of communicating with the first terminal and the first terminal may be located in a same place.

In combination with the first aspect or any abovementioned possible implementation mode, in a seventh possible implementation mode of the first aspect, the place may be an office, a home or a school.

In combination with the first aspect or any abovementioned possible implementation mode, in an eighth possible implementation mode of the first aspect, the second terminal may include multiple terminals; and the operation that the first terminal performs communication with the second terminal may include that: the first terminal sends data to the second terminal by virtue of a group ID corresponding to the multiple terminals.

In combination with the first aspect or any abovementioned possible implementation mode, in a ninth possible implementation mode of the first aspect, before the operation that the first terminal acquires the attribute information of the second terminal according to the subscription information of the second terminal, the method may further include that: the subscription information, prestored by the first terminal, of the second terminal is acquired.

In combination with the first aspect or any abovementioned possible implementation mode, in a tenth possible implementation mode of the first aspect, the ID of the second terminal may be an International Mobile Subscriber Identity (IMSI), a Temporary Mobile Station Identity (TMSI) or an International Mobile Equipment Identity (IMEI).

In combination with the first aspect or any abovementioned possible implementation mode, in an eleventh possible implementation mode of the first aspect, a radio frequency bandwidth supported by the second terminal may be less than or equal to 1.4 MHZ.

Therefore, in a D2D communication process, the first terminal acquires the attribute information of the second terminal and performs communication with the second terminal according to the attribute information of the second terminal, and a success rate of data communication may be increased. For example, if the attribute information includes the maximum receiving bandwidth, the maximum data block size that can be received or the number of receive antennas of the second terminal, a data receiving failure, caused by an excessively large bandwidth occupied by the sent data and an excessively large data block, of the second terminal may be avoided. For example, if the attribute information includes the maximum sending bandwidth, the maximum data block size that can be sent or the number of transmit antennas of the second terminal, a data receiving failure of the first terminal may be avoided.

Furthermore, the first terminal determines the capability information of the second terminal to communicate with the first terminal on the basis of the capability information of the second terminal to communicate with the network device, and D2D communication may be performed with reference to cellular network communication capability information, so that a success rate of D2D communication may be increased without changing a protocol as much as possible.

A second aspect provides a D2D communication method, which may include that: a first terminal acquires a present location of the first terminal; the first terminal sends a request message to a network device, wherein the request message is configured to request for terminals capable of communicating with the first terminal at the present location and attribute information of the terminals capable of communicating with the first terminal; the first terminal receives a response message sent by the network device, wherein the response message is configured to indicate the terminals capable of communicating with the first terminal at the present location and the attribute information of the terminals capable of communicating with the first terminal; the first terminal selects a second terminal from the terminals capable of communicating with the first terminal; and the first terminal performs communication with the second terminal according to the attribute information of the second terminal.

In combination with the second aspect, in a first possible implementation mode of the second aspect, the attribute information of the second terminal may include first capability information of the second terminal, the first capability information may be capability information of the second terminal to communicate with the first terminal, and the operation that the first terminal performs communication with the second terminal may include that: the first terminal performs communication with the second terminal on the basis of the first capability information.

In combination with the second aspect or any abovementioned possible implementation mode, in a second possible implementation mode of the second aspect, the attribute information of the second terminal may include second capability information of the second terminal, the second capability information may be capability information of the second terminal to communicate with the network device, and the operation that the first terminal performs communication with the second terminal may include that: the first terminal determines first capability information on the basis of the second capability information, the first capability information being capability information of the second terminal to communicate with the first terminal; and the first terminal performs communication with the second terminal on the basis of the first capability information.

In combination with the second aspect or any abovementioned possible implementation mode, in a third possible implementation mode of the second aspect, the first capability information may include at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

In combination with the second aspect or any abovementioned possible implementation mode, in a fourth possible implementation mode of the second aspect, the terminals capable of communicating with the first terminal and the first terminal may be located in a same place.

In combination with the second aspect or any abovementioned possible implementation mode, in a fifth possible implementation mode of the second aspect, the place may be an office, a home or a school.

In combination with the second aspect or any abovementioned possible implementation mode, in a sixth possible implementation mode of the second aspect, the second terminal may include multiple terminals; and the operation that the first terminal performs communication with the second terminal may include that: the first terminal sends data to the multiple terminals by virtue of a group ID corresponding to the multiple terminals.

In combination with the second aspect or any abovementioned possible implementation mode, in a seventh possible implementation mode of the second aspect, a radio frequency bandwidth supported by the second terminal may be less than or equal to 1.4 MHZ.

Therefore, in a D2D communication process, the first terminal acquires the attribute information of the second terminal and performs communication with the second terminal according to the attribute information of the second terminal, and a success rate of data communication may be increased. For example, if the attribute information includes the maximum receiving bandwidth, the maximum data block size that can be received or the number of receive antennas of the second terminal, a data receiving failure, caused by an excessively large bandwidth occupied by the sent data and an excessively large data block, of the second terminal may be avoided. For example, if the attribute information includes the maximum sending bandwidth, the maximum data block size that can be sent or the number of transmit antennas of the second terminal, a data receiving failure of the first terminal may be avoided.

Furthermore, the first terminal determines the capability information of the second terminal to communicate with the first terminal on the basis of the capability information of the second terminal to communicate with the network device, and D2D communication may be performed with reference to cellular network communication capability information, so that a success rate of D2D communication may be increased without changing a protocol as much as possible.

A third aspect provides a terminal, which is configured to execute the method in the first aspect or any optional implementation mode of the first aspect. Specifically, the terminal includes module units configured to execute the method in the first aspect or any possible implementation mode of the first aspect.

A fourth aspect provides a terminal, which is configured to execute the method in the second aspect or any optional implementation mode of the second aspect. Specifically, the terminal includes module units configured to execute the method in the second aspect or any possible implementation mode of the second aspect.

A fifth aspect provides a terminal, which includes a memory and a processor. The memory is configured to store an instruction, the processor is configured to execute the instruction stored in the memory, and when the processor executes the instruction stored in the memory, such execution enables the processor to execute the method in the first aspect or any optional implementation mode of the first aspect.

A sixth aspect provides a terminal, which includes a memory and a processor. The memory is configured to store an instruction, the processor is configured to execute the instruction stored in the memory, and when the processor executes the instruction stored in the memory, such execution enables the processor to execute the method in the second aspect or any optional implementation mode of the second aspect.

A seventh aspect provides a computer storage medium, in which a program code is stored, the program code being configured to indicate the method in the first aspect or any optional implementation mode of the first aspect to be executed.

An eighth aspect provides a computer storage medium, in which a program code is stored, the program code being configured to indicate the method in the second aspect or any optional implementation mode of the second aspect to be executed.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings illustrate that an application running on computing equipment and the computing equipment may both be parts. One or more parts may reside in a process and/or an execution thread, and the parts may be located on a computer and/or distributed between two or more computers. In addition, these parts may be executed from various computer-readable media with various data structures stored thereon. The parts may communicate through local and/or remote processes according to, for example, signals with one or more data groups (for example, data from two parts interacting with another part of a local system, a distributed system and/or a network, for example, the Internet interacting with another system through a signal).

Each aspect or characteristic of the disclosure may be implemented into a method, a device or a product programmed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or bearing instructions and/or data.

A terminal device in the embodiments of the disclosure may also be called as an access terminal, a user unit, a user station, a mobile station, a mobile radio station, a remote station, a remote terminal, a mobile device, a user terminal, User Equipment (UE), a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment and terminal equipment in a future 5th-Generation (5G) network. A base station may be a Base Transceiver Station (BTS) in a Global System of Mobile Communication (GSM) or Code Division Multiple Access (CDMA), may also be a NodeB (NB) in Wideband Code Division Multiple Access (WCDMA), and may further be an Evolutional Node B (eNB or eNodeB) in Long Term Evolution (LTE), or a relay station or access point. A network device may be a base station, a Mobility Management Entity (MME), vehicle-mounted equipment, wearable equipment, network equipment in the future 5G network and the like.

Figure 1:
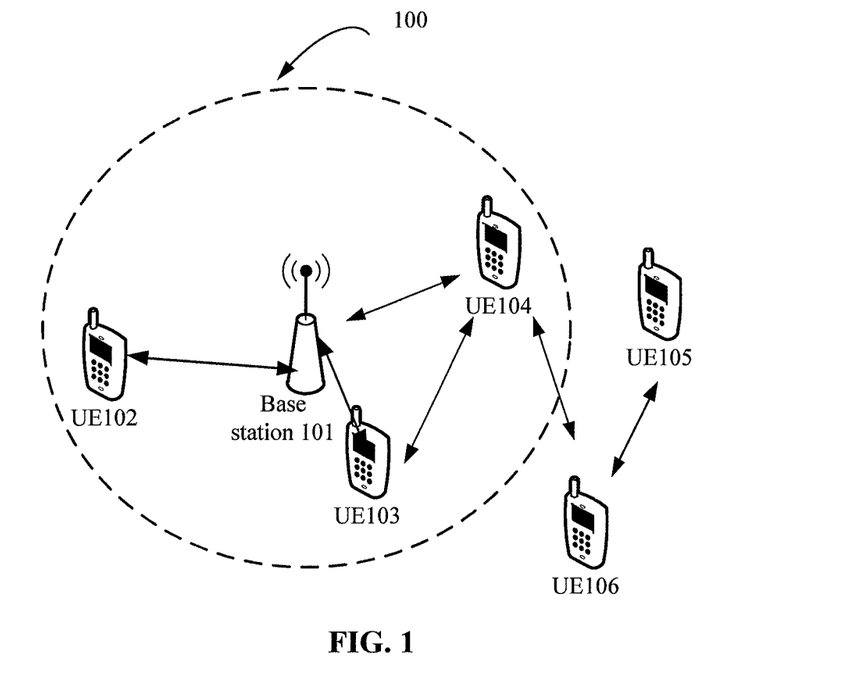
FIG. 1 is a schematic diagram of a communication scenario according to an embodiment of the disclosure.

FIG. 1 is a schematic diagram of an application scenario 100 according to an embodiment of the disclosure. In FIG.

1, UE 102, UE 103 and UE 104 are in coverage of a base station 101, the UE 102, the UE 103 and the UE 104 may directly communicate with the base station, and the UE 102, the UE 103 and the UE 104 may perform D2D communication. UE 105 and UE 106 are out of the coverage of the base station, and the UE 105 and the UE 106 may directly perform D2D communication or perform D2D communication with the UE 102, the UE 103 and the UE 104.

D2D technology has the following advantages by virtue of its own short-distance communication characteristic and direct communication manner.

1: the short-distance direct communication manner for a terminal may achieve a higher data rate, a shorter delay and lower power consumption;

2: by virtue of a short-distance characteristic of terminals and D2D communication links widely distributed in a network, effective utilization of spectrum resources may be implemented, and a resource space division multiplexing gain may be obtained;

3: the D2D direct communication manner may be adapted to a local data sharing requirement of a service such as wireless Point-to-Point (P2P) and provide data service with high flexible adaptability; and 4: D2D direct communication may extend coverage of the network by virtue of a large number of widely distributed communication terminals in the network.

In a hybrid cellular and D2D network, terminals may communicate in two different modes. The first mode is a cellular communication mode: the terminals communicate through base stations. The second mode is a D2D mode: the terminals directly communicate by virtue of D2D links. In the hybrid network, part of terminals still perform information forwarding and communication through the base stations in the cellular communication mode, but part of terminals perform direct data transmission in the D2D mode.

D2D not only is adopted for a public security service but also may be widely applied to commercial scenarios to solve practical problems about coverage extension, device power saving and the like. For example, coverage enhancement may be implemented through a terminal relay technology, a terminal out of coverage of a cellular network may implement data communication with the network through a relay, and thus extension of the coverage of the network is implemented in a sense. In addition, similar short-distance communication may be adopted to reduce sending power of the terminal and favorably prolong service life of a battery of the terminal.

Along with the rise of the Internet of things, supporting Machine Type Communication (MTC) in an LTE system attracts more and more attentions. A physical-layer enhancement project for MTC is set up in 3rd Generation Partnership Project (3GPP) Release 13. An MTC device (MTC terminal) may have part of multiple Machine to Machine (M2M) communication characteristics, for example, characteristics of low mobility, small transmitted data volume, insensitivity to a communication delay, requirement on extremely low power consumption and the like. For reducing cost of an MTC terminal, a new terminal type is defined, and both of its uplink and downlink support a 1.4 MHz radio frequency bandwidth or a smaller system bandwidth, for example, 200 KHz.

In a D2D communication process, when a sending terminal does not know about attribute information of a receiving terminal, data transmission may exceed a receiving limit of the receiving terminal, for example, a receiving bandwidth or a maximum received block size may be exceeded, to make it impossible for the receiving terminal to correctly receive data. Therefore, the embodiments of the disclosure provide a D2D communication method, a terminal device and a network device.

Figure 2:
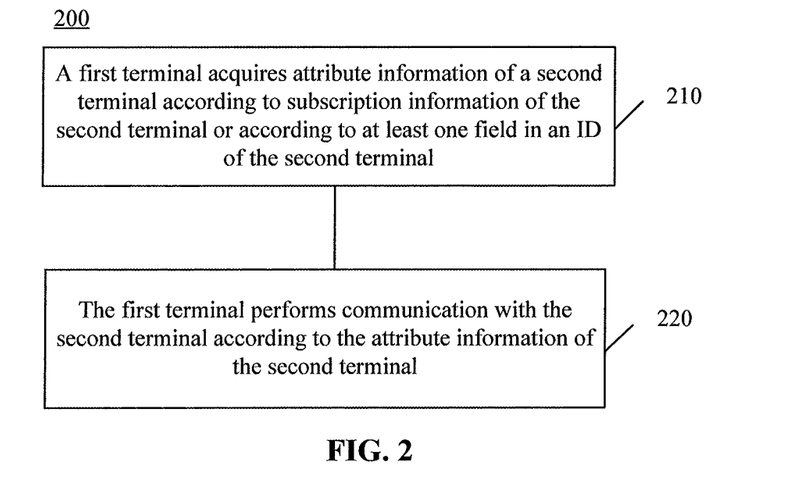
FIG. 2 is a schematic flowchart of a D2D communication method according to an embodiment of the disclosure.

FIG. 2 is a schematic flowchart of a D2D communication method according to an embodiment of the disclosure.

In 210, a first terminal acquires attribute information of a second terminal according to subscription information of the second terminal or according to at least one field in an ID of the second terminal.

In 220, the first terminal performs communication with the second terminal according to the attribute information of the second terminal.

Optionally, the attribute information of the second terminal includes first capability information of the second terminal, and the first capability information is capability information of the second terminal to communicate with the first terminal. The first terminal performs data transmission with the second terminal on the basis of the first capability information.

That is, the first terminal may directly obtain the capability information of the second terminal to communicate with the first terminal according to at least one of the subscription information of the second terminal or the at least one field in the ID of the second terminal, so that the first terminal may directly perform data transmission according to the capability information of the second terminal to communicate with the first terminal.

Optionally, the attribute information of the second terminal includes second capability information of the second terminal, and the second capability information is capability information of the second terminal to communicate with a network device. The first terminal determines first capability information on the basis of the second capability information, the first capability information being capability information of the second terminal to communicate with the first terminal; and the first terminal performs data transmission with the second terminal on the basis of the first capability information.

That is, the first terminal may directly obtain the capability information of the second terminal to communicate with the network device according to the subscription information of the second terminal and the at least one field in the ID of the second terminal. The first terminal may determine the capability information of the second terminal to communicate with the first terminal on the basis of the capability information of the second terminal to communicate with the network device.

For example, the first terminal may directly determine the capability information of the second terminal to communicate with the network device as the capability information of the second terminal to communicate with the first terminal.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the second capability information may include Packet Data Convergence Protocol (PDCP) layer, Radio Link Control (RLC) layer, physical layer, radio frequency capability information or the like of the second terminal.

Optionally, the subscription information of the second terminal may be prestored on the first terminal.

Optionally, attribute information of multiple terminals may be prestored on the first terminal. The first terminal determines the second terminal from multiple terminals capable of communicating with the first terminal.

For example, the first terminal may determine the second terminal according to the attribute information of the multiple terminals.

For example, a terminal of which a maximum receiving bandwidth, a maximum sending bandwidth, a maximum data block size that can be sent, a maximum data block size that can be received, a number of transmit antennas or a number of receive antennas during data transmission with the first terminal may meet a data transmission requirement may be determined as the second terminal. Alternatively, a terminal of which at least one of a maximum receiving bandwidth, a maximum sending bandwidth, a maximum data block size that can be sent or a maximum data block size that can be received during data transmission with the first terminal is maximum may be determined as the second terminal.

Optionally, the first terminal acquires a present location of the first terminal, and terminals capable of communicating with the first terminal at the present location are acquired according to subscription information of the multiple terminals.

That is, subscription information of a terminal may indicate a specific location at which another terminal capable of communicating with the terminal is located, so that the first terminal may determine whether the location capable of communicating with the terminal is within the present location of the first terminal. If YES, the terminal is determined as the second terminal.

Optionally, the terminals capable of communicating with the first terminal and the first terminal may be located in the same place. For example, the place is an office, a home or a school.

Optionally, the abovementioned second terminal may include multiple terminals, and then the ID of the second terminal may be an ID for indicating the multiple terminals. For example, the multiple terminals may be called as a group, and then the ID of the second terminal may also be called as a group ID.

Optionally, in the embodiment of the disclosure, the at least one field of the ID of the second terminal may be configured to indicate the attribute information of the second terminal.

Optionally, the ID of the second terminal may be an IMSI, a TMSI or an IMEI.

For example, the first capability information or second capability information of the second terminal may be indicated, for example, as illustrated in Table 1.

TABLE 1

| UE ID | Attribute |
| --- | --- |
| 000000xxxxxxx | Normal terminal |
| 000001xxxxxxx | The receiving bandwidth is BWr1 and the sending bandwidth is BWt1; and the received data block is TBSr1 and the sent data block is TBSt1 |
| 000010xxxxxxx | The receiving bandwidth is BWr1 and the sending bandwidth is BWt2; and the received data block is TBSr1 and the sent data block is TBSt2 |
| ... | |
| 111111xxxxxxx | Reserved |

In Table 1, the first six bits of the ID may be configured to indicate the first capability information of the terminal. For example, 000000 represents that the terminal is a normal terminal and indicates that the terminal may not support a 1.4 MHz radio frequency bandwidth or a smaller system bandwidth. 000001 represents that the receiving bandwidth of the terminal for communicating with another terminal is BWr1, the sending bandwidth is BWt1, the received data block is TBSr1, the sent data block is TBSt1, and the terminal may support the 1.4 MHz radio frequency bandwidth or a smaller system bandwidth. 000010 represents that the receiving bandwidth of the terminal for communicating with another terminal is BWr1, the sending bandwidth is BWt2, the received data block is TBSr1, the sent data block is TBSt2, and the terminal may support the 1.4 MHz radio frequency bandwidth or a smaller system bandwidth. 111111xxxxxxx represents a reserved value. Herein, each of BWr1, BWt1 and the like only represents a certain value.

Figure 3:
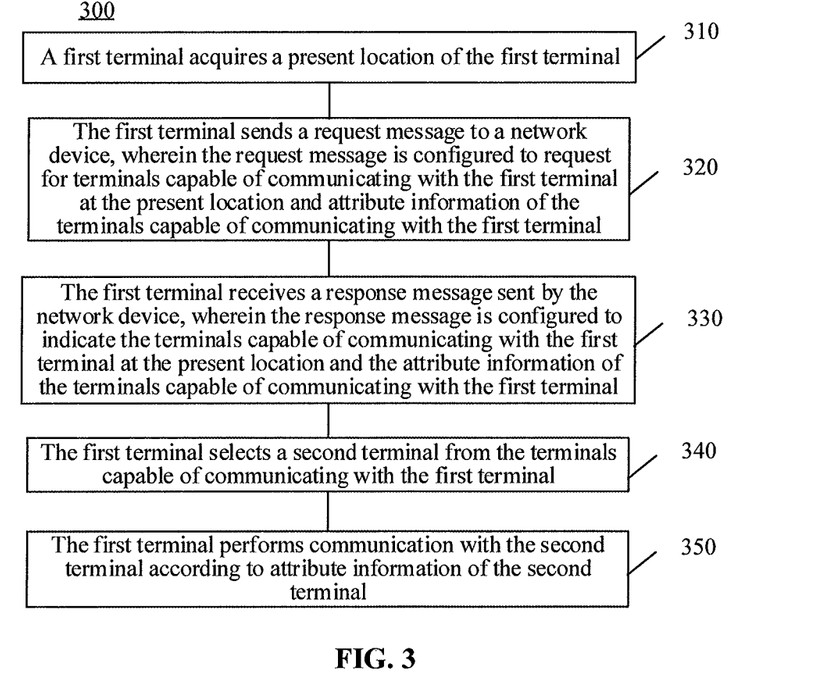
FIG. 3 is a schematic flowchart of a D2D communication method according to an embodiment of the disclosure.

FIG. 3 is a schematic block diagram of a communication method 300 according to an embodiment of the disclosure.

In 310, a first terminal acquires a present location of the first terminal.

In 320, the first terminal sends a request message to a network device, wherein the request message is configured to request for terminals capable of communicating with the first terminal at the present location and attribute information of the terminals capable of communicating with the first terminal.

In 330, the first terminal receives a response message sent by the network device, wherein the response message is configured to indicate the terminals capable of communicating with the first terminal at the present location and the attribute information of the terminals capable of communicating with the first terminal.

In 340, the first terminal selects a second terminal from the terminals capable of communicating with the first terminal.

In 350, the first terminal performs communication with the second terminal according to attribute information of the second terminal.

Optionally, the attribute information of the second terminal includes first capability information of the second terminal, and the first capability information is capability information of the second terminal to communicate with the first terminal. The first terminal performs data transmission with the second terminal on the basis of the first capability information.

Optionally, the attribute information of the second terminal includes second capability information of the second terminal, and the second capability information is capability information of the second terminal to communicate with the network device. The first terminal determines first capability information on the basis of the second capability information, the first capability information being the capability information of the second terminal to communicate with the first terminal, and the first terminal performs data transmission with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the second capability information may include PDCP layer, RLC layer, physical layer, radio frequency capability information or the like of the second terminal.

Optionally, the first terminal determines a second terminal according to attribute information of multiple second terminals.

For example, a terminal of which a maximum receiving bandwidth, a maximum sending bandwidth, a maximum data block size that can be sent, a maximum data block size that can be received, a number of transmit antennas or a number of receive antennas during data transmission with the first terminal may meet a data transmission requirement may be determined as the second terminal. Alternatively, a terminal of which at least one of a maximum receiving bandwidth, a maximum sending bandwidth, a maximum data block size that can be sent or a maximum data block size that can be received during data transmission with the first terminal is maximum may be determined as the second terminal.

Optionally, the first terminal acquires a present location of the first terminal, and terminals capable of communicating with the first terminal at the present location are acquired according to the subscription information of the multiple terminals.

Optionally, the terminals capable of communicating with the first terminal and the first terminal may be located in the same place. For example, the place is an office, a home or a school.

Optionally, a radio frequency bandwidth supported by the second terminal is less than or equal to 1.4 MHZ.

Figure 4:
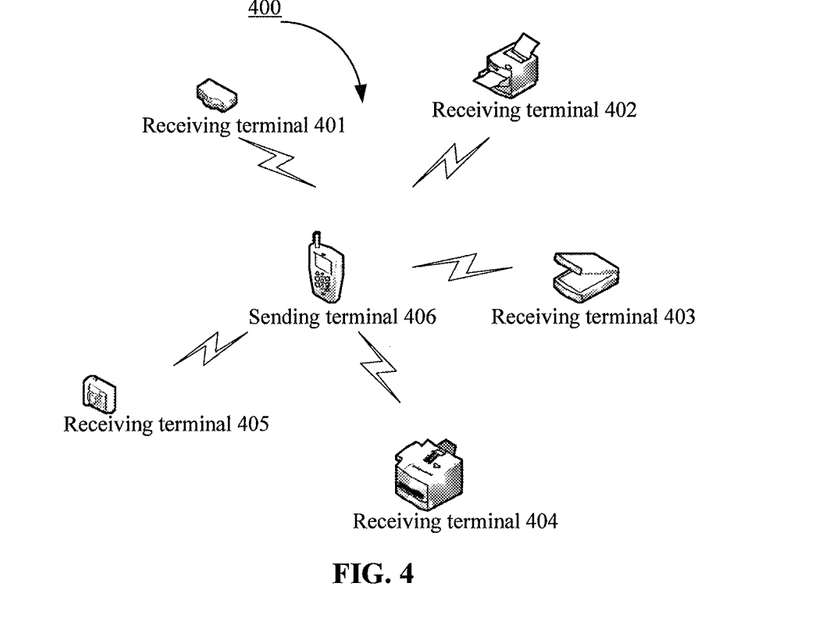
FIG. 4 is a schematic block diagram of a communication scenario according to an embodiment of the disclosure.
Figure 5:
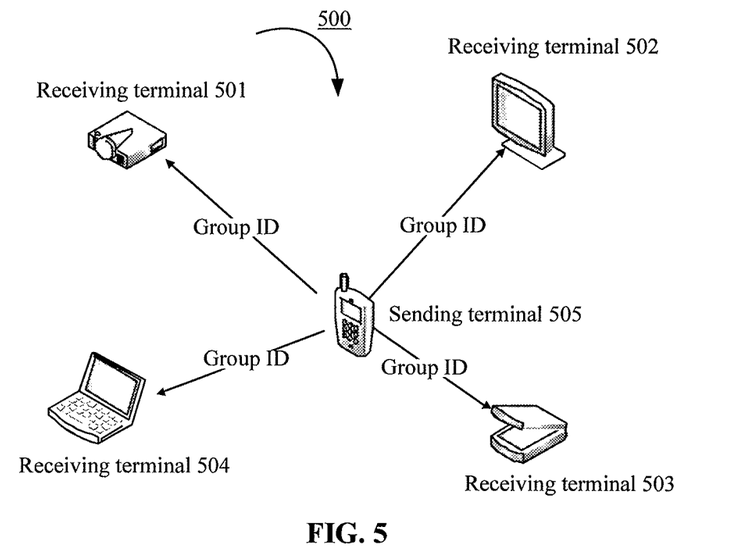
FIG. 5 is a schematic block diagram of a communication scenario according to an embodiment of the disclosure.

FIG. 4 and FIG. 5 illustrate scenarios 400 and 500 to which the communication methods 200 and 300 may be applied.

In the communication scenario 400 illustrated in FIG. 4, a sending terminal 406, a receiving terminal 401, a receiving terminal 402, a receiving terminal 403, a receiving terminal 404 and a receiving terminal 405 belong to the same place, for example, the same office, and each receiving terminal may be office equipment such as a router, a printer, a scanner, a camera or the like. The sending terminal 406 may determine a receiving terminal from the multiple receiving terminals and initiate data communication with the receiving terminal according to attribute information of the receiving terminal.

In the communication scenario 500 illustrated in FIG. 5, a sending terminal 505, a receiving terminal 501, a receiving terminal 502, a receiving terminal 503 and a receiving terminal 504 belong to the same place, for example, the same office, and each receiving terminal may be office equipment such as a projector, a display, a scanner, a computer or the like. The sending terminal 505 determines that the receiving terminal 501, the receiving terminal 502, the receiving terminal 503 and the receiving terminal 504 belong to the same group, and then may acquire a group ID and attribute information of each terminal in the group and initiate communication with group members according to the attribute information of each terminal. For example, a minimum value of maximum data blocks that can be received of terminals may be determined as a data block size for this data transmission.

Therefore, in a D2D communication process, the first terminal acquires the attribute information of the second terminal and performs communication with the second terminal according to the attribute information of the second terminal, and a success rate of data communication may be increased. For example, if the attribute information includes the maximum receiving bandwidth, the maximum data block size that can be received or the number of receive antennas of the second terminal, a data receiving failure, caused by an excessively large bandwidth occupied by the sent data and an excessively large data block, of the second terminal may be avoided. For example, if the attribute information includes the maximum sending bandwidth, the maximum data block size that can be sent or the number of transmit antennas of the second terminal, a data receiving failure of the first terminal may be avoided.

Furthermore, the first terminal determines the capability information of the second terminal to communicate with the first terminal on the basis of the capability information of the second terminal to communicate with the network device, and D2D communication may be performed with reference to cellular network communication capability information, so that a success rate of D2D communication may be increased without changing a protocol as much as possible.

Figure 6:
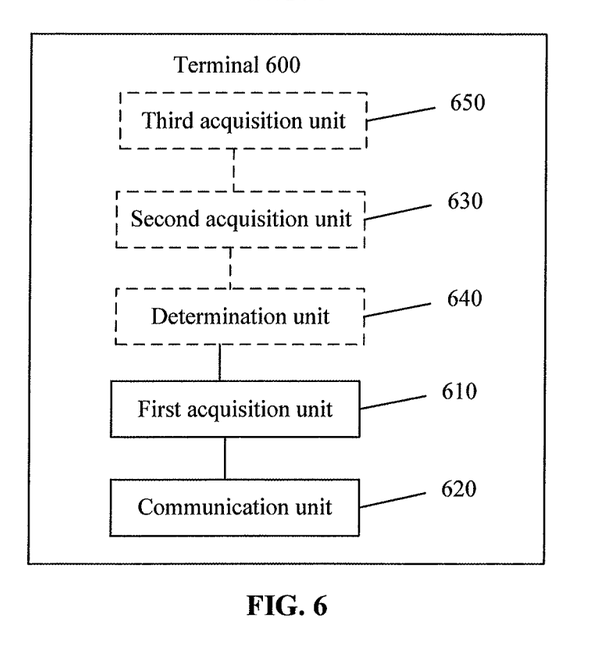
FIG. 6 is a schematic block diagram of a terminal according to an embodiment of the disclosure.

FIG. 6 is a schematic block diagram of a terminal 600 according to an embodiment of the disclosure. As illustrated in FIG. 6, the terminal 600 includes a first acquisition unit 610 and a communication unit 620.

The first acquisition unit 610 may be configured to acquire attribute information of a second terminal according to subscription information of the second terminal or according to at least one field in an ID of the second terminal; and the communication unit 620 may be configured to perform D2D communication with the second terminal according to the attribute information of the second terminal.

Optionally, the attribute information of the second terminal includes first capability information of the second terminal, the first capability information is capability information of the second terminal to communicate with the terminal 600, and the communication unit 620 may be specifically configured to perform D2D communication with the second terminal on the basis of the first capability information.

Optionally, the attribute information of the second terminal includes second capability information of the second terminal, the second capability information is capability information of the second terminal to communicate with a network device, and the communication unit 620 may be specifically configured to: determine first capability information of the second terminal on the basis of the second capability information, the first capability information being capability information of the second terminal to communicate with the terminal 600; and perform D2D communication with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the terminal 600.

Optionally, as illustrated in FIG. 6, the terminal 600 further includes a second acquisition unit 630 and a determination unit 640. The second acquisition unit 630 may be configured to, before the first acquisition unit 610 acquires the attribute information of the second terminal, acquire terminals capable of communicating with the terminal 600 according to subscription information of multiple terminals; and the determination unit 640 may be configured to determine the second terminal from the terminals capable of communicating with the terminal 600.

Optionally, the second acquisition unit 630 may be specifically configured to: acquire a present location of the terminal 600; and acquire terminals capable of communicating with the terminal 600 at the present location according to the subscription information of the multiple terminals.

Optionally, the terminals capable of communicating with the terminal 600 and the terminal 600 may be located in the same place.

Optionally, the place may be an office, a home or a school.

Optionally, the second terminal may include multiple terminals. The communication unit 620 may be specifically configured to send data to the second terminal by virtue of a group ID corresponding to the second terminal.

Optionally, as illustrated in FIG. 6, the terminal 600 further includes a third acquisition unit 650. The third acquisition unit 650 may be configured to, before the first acquisition unit 610 acquires the attribute information of the second terminal according to the subscription information of the second terminal, acquire the subscription information, prestored on the terminal 600, of the second terminal.

Optionally, the ID of the second terminal is an IMSI, a TMSI or an IMEI.

Optionally, a radio frequency bandwidth supported by the second terminal may be less than or equal to 1.4 MHZ.

It should be understood that the terminal 600 may correspond to a first terminal illustrated in FIG. 2, and may realize corresponding functions of the first terminal, which will not be elaborated herein for simplicity.

Figure 7:
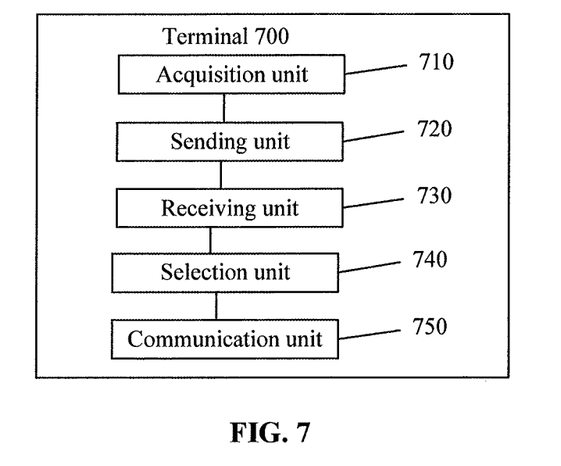
FIG. 7 is a schematic block diagram of a terminal according to an embodiment of the disclosure.

FIG. 7 is a schematic block diagram of a terminal 700 according to an embodiment of the disclosure. As illustrated in FIG. 7, the terminal 700 includes: an acquisition unit 710, configured to acquire a present location of the terminal; a sending unit 720, configured to send a request message to a network device, wherein the request message is configured to request for terminals capable of communicating with the terminal at the present location and attribute information of the terminals capable of communicating with the terminal; a receiving unit 730, configured to receive a response message sent by the network device, wherein the response message is configured to indicate the terminals capable of communicating with the terminal at the present location and the attribute information of the terminals capable of communicating with the terminal; a selection unit 740, configured to select a second terminal from the terminals capable of communicating with the terminal; and a communication unit 750, configured to perform D2D communication with the second terminal according to attribute information of the second terminal.

Optionally, the attribute information of the second terminal includes first capability information of the second terminal, the first capability information is capability information of the second terminal to communicate with the terminal, and the communication unit 750 may be specifically configured to perform D2D communication with the second terminal on the basis of the first capability information.

Optionally, the attribute information of the second terminal includes second capability information of the second terminal, the second capability information is capability information of the second terminal to communicate with the network device, and the communication unit 750 may be specifically configured to: determine first capability information on the basis of the second capability information, the first capability information being capability information of the second terminal to communicate with the terminal; and perform D2D communication with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the terminal.

Optionally, the terminals capable of communicating with the terminal and the terminal may be located in the same place.

Optionally, the place may be an office, a home or a school.

Optionally, the second terminal includes multiple terminals. The communication unit 750 may be specifically configured to send data to the multiple terminals by virtue of a group ID corresponding to the multiple terminals.

Optionally, a radio frequency bandwidth supported by the second terminal may be less than or equal to 1.4 MHZ.

It should be understood that the terminal 700 may correspond to a first terminal illustrated in FIG. 3, and may realize corresponding functions of the first terminal, which will not be elaborated herein for simplicity.

Figure 8:
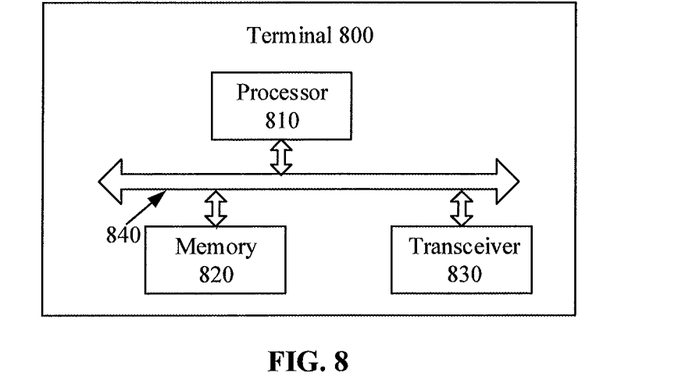
FIG. 8 is a schematic block diagram of a terminal according to an embodiment of the disclosure.

FIG. 8 is a schematic block diagram of a terminal 800 according to an embodiment of the disclosure. As illustrated in FIG. 8, the terminal 800 includes a processor 810 and a memory 820. The memory 820 may be configured to store a program instruction. The processor 810 may call the program instruction stored in the memory 820 and may execute corresponding operations of a first terminal in FIG. 2 in the method embodiment. The terminal 800 further includes a transceiver 830 configured for external communication and a bus system 840 configured to interconnect the processor 810, the memory 820 and the transceiver 830.

Optionally, the processor 810 may be configured to call the instruction stored in the memory 820 to execute the following operations:

acquiring attribute information of a second terminal according to subscription information of the second terminal or according to at least one field in an ID of the second terminal; and performing communication with the second terminal through the transceiver 830 according to the attribute information of the second terminal.

Optionally, the attribute information of the second terminal includes first capability information of the second terminal, the first capability information is capability information of the second terminal to communicate with the terminal 800, and the processor 810 may be configured to call the instruction stored in the memory 820 to execute the following operation: utilizing the transceiver 830 to perform communication with the second terminal on the basis of the first capability information.

Optionally, the attribute information of the second terminal includes second capability information of the second terminal, the second capability information is capability information of the second terminal to communicate with a network device. The processor 810 may be configured to call the instruction stored in the memory 820 to execute the following operations: determining first capability information of the second terminal on the basis of the second capability information, the first capability information being capability information of the second terminal to communicate with the terminal 800; and utilizing the transceiver 830 to perform communication with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the terminal 800.

Optionally, the processor 810 may be configured to call the instruction stored in the memory 820 to execute the following operations: before acquiring the attribute information of the second terminal, acquiring terminals capable of communicating with the terminal 800 according to subscription information of multiple terminals; and determining the second terminal from the terminals capable of communicating with the terminal 800.

Optionally, the processor 810 may be configured to call the instruction stored in the memory 820 to execute the following operations: acquiring a present location of the terminal 800; and acquiring terminals capable of communicating with the terminal 800 at the present location according to the subscription information of the multiple terminals.

Optionally, the terminals capable of communicating with the terminal 800 and the terminal 800 may be located in the same place.

Optionally, the place may be an office, a home or a school.

Optionally, the second terminal includes multiple terminals. The processor 810 may be configured to call the instruction stored in the memory 820 to execute the following operation: utilizing the transceiver 830 to send data to the second terminal by virtue of a group ID corresponding to the multiple terminals.

Optionally, the processor 810 may be configured to call the instruction stored in the memory 820 to execute the following operation: before acquiring the attribute information of the second terminal according to the subscription information of the second terminal, acquiring the subscription information, prestored on the terminal 800, of the second terminal.

Optionally, the ID of the second terminal may be an IMSI, a TMSI or an IMEI.

Optionally, a radio frequency bandwidth supported by the second terminal may be less than or equal to 1.4 MHZ.

It should be understood that the terminal 800 may correspond to a first terminal illustrated in FIG. 2, and may realize corresponding functions of the first terminal, which will not be elaborated herein for simplicity.

Figure 9:
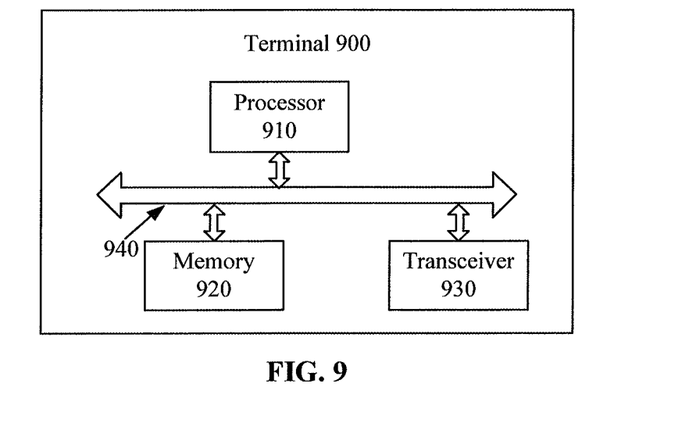
FIG. 9 is a schematic block diagram of a terminal according to an embodiment of the disclosure.

FIG. 9 is a schematic block diagram of a terminal 900 according to an embodiment of the disclosure. As illustrated in FIG. 9, the terminal 900 includes a processor 910 and a memory 920. The memory 920 may be configured to store a program instruction. The processor 910 may call the program instruction stored in the memory 920 and may execute corresponding operations of the terminal 900 in the method embodiment. The terminal 900 further includes a transceiver 930 configured for external communication and a bus system 940 configured to interconnect the processor 910, the memory 920 and the transceiver 930.

Optionally, the processor 910 may be configured to call the instruction stored in the memory 920 to execute the following operations: acquiring a present location of a first terminal; sending a request message to a network device through the transceiver 930, the request message being configured to request for terminals capable of communicating with the first terminal at the present location and attribute information of the terminals capable of communicating with the first terminal; receiving a response message sent by the network device through the transceiver 930, the response message being configured to indicate the terminals capable of communicating with the first terminal at the present location and the attribute information of the terminals capable of communicating with the first terminal; selecting a second terminal from the terminals capable of communicating with the first terminal; and performing communication with the second terminal through the transceiver 930 according to the attribute information of the second terminal.

Optionally, the attribute information of the second terminal includes first capability information of the second terminal, and the first capability information is capability information of the second terminal to communicate with the terminal.

The processor 910 may be configured to call the instruction stored in the memory 920 to execute the following operation: utilizing the transceiver 930 to perform communication with the second terminal on the basis of the first capability information.

Optionally, the attribute information of the second terminal includes second capability information of the second terminal, the second capability information is capability information of the second terminal to communicate with the network device. The processor 910 may be configured to call the instruction stored in the memory 920 to execute the following operations: determining first capability information on the basis of the second capability information, the first capability information being capability information of the second terminal to communicate with the terminal; and utilizing the transceiver 930 to perform communication with the second terminal on the basis of the first capability information.

Optionally, the first capability information includes at least one of a maximum receiving bandwidth, a maximum sending bandwidth, a maximum data block size that can be sent, a maximum data block size that can be received, a number of transmit antennas or a number of receive antennas of the second terminal during data transmission with the first terminal.

Optionally, the terminals capable of communicating with the first terminal and the first terminal may belong to the same place.

Optionally, the place may be an office, a home or a school.

Optionally, the second terminal includes multiple terminals. The processor 910 may be configured to call the instruction stored in the memory 920 to execute the following operation: utilizing the transceiver 930 to send data to the multiple terminals by virtue of a group ID corresponding to the multiple terminals.

Optionally, a radio frequency bandwidth supported by the second terminal may be less than or equal to 1.4 MHZ.

It should be understood that the terminal 900 may correspond to a first terminal illustrated in FIG. 3, and may realize corresponding functions of the first terminal, which will not be elaborated herein for simplicity.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A Device-to-Device (D2D) communication method, comprising:
   acquiring, by a first terminal, attribute information of a second terminal according to at least one field in an Identifier (ID) of the second terminal, wherein the attribute information of the second terminal comprises first capability information of the second terminal, the first capability information is capability information of the second terminal to communicate with a network device and the first capability information comprises at least one of Packet Data Convergence Protocol (PDCP) layer, Radio Link Control (RLC) layer, physical layer, radio frequency capability information of the second terminal;
   determining, by the first terminal, second capability information of the second terminal on the basis of the first capability information, wherein the second capability information is capability information of the second terminal to communicate with the first terminal, the second capability information comprises a maximum receiving bandwidth, a maximum sending bandwidth, a maximum data block size that can be sent, a maximum data block size that can be received, a number of transmit antennas and a number of receive antennas of the second terminal during data transmission with the terminal; and
   performing, by the first terminal, communication with the second terminal according to the second capability information of the second terminal.

2. A terminal, comprising: a memory, a processor, and a computer program stored on the memory and capable of running on the processor, wherein the computer program, when executed by the processor, cause the processor to execute operations comprising:
   acquiring attribute information of a second terminal according to at least one field in an Identifier (ID) of the second terminal, wherein the attribute information of the second terminal comprises first capability information of the second terminal, the first capability information is capability information of the second terminal to communicate with a network device and the first capability information comprises at least one of Packet Data Convergence Protocol (PDCP) layer, Radio Link Control (RLC) layer, physical layer, radio frequency capability information of the second terminal;
   determining second capability information of the second terminal on the basis of the first capability information, wherein the second capability information is capability information of the second terminal to communicate with the terminal, and the second capability information comprises a maximum receiving bandwidth, a maximum sending bandwidth, a maximum data block size that can be sent, a maximum data block size that can be received, a number of transmit antennas and a number of receive antennas of the second terminal during data transmission with the terminal; and
   performing Device-to-Device (D2D) communication with the second terminal on the basis of the second capability information of the second terminal.

3. The terminal according to claim 2, wherein the processor is further configured to:
   before acquiring the attribute information of the second terminal, acquire terminals capable of communicating with the terminal according to subscription information of multiple terminals; and
   determine the second terminal from the terminals capable of communicating with the terminal.

4. The terminal according to claim 3, wherein the processor is specifically configured to:
   acquire a present location of the terminal; and
   acquire terminals capable of communicating with the terminal at the present location according to the subscription information of the multiple terminals.

5. The terminal according to claim 4, wherein the terminals capable of communicating with the terminal and the terminal are located in a same place, and the place is an office, a home or a school.

6. The terminal according to claim 2, wherein the second terminal comprises multiple terminals; and
   the processor is specifically configured to:
   send data to the second terminal by virtue of a group ID corresponding to the multiple terminals.

7. The terminal according to claim 2, wherein the ID of the second terminal is an International Mobile Subscriber Identity (IMSI), a Temporary Mobile Station Identity (TMSI) or an International Mobile Equipment Identity (IMEI).

8. The terminal according to claim 2, wherein a radio frequency bandwidth supported by the second terminal is less than or equal to 1.4 MHZ.

9. A terminal, comprising: a memory, a processor, and a computer program stored on the memory and capable of running on the processor, wherein the computer program, when executed by the processor, cause the processor to execute operations comprising:
acquiring a present location of the terminal;
sending a request message to a network device, wherein the request message is configured to request for terminals capable of communicating with the terminal at the present location and attribute information of the terminals capable of communicating with the terminal;
receiving a response message sent by the network device, wherein the response message is configured to indicate the terminals capable of communicating with the terminal at the present location and the attribute information of the terminals capable of communicating with the terminal;
selecting a second terminal from the terminals capable of communicating with the terminal; and
performing Device-to-Device (D2D) communication with the second terminal according to attribute information of the second terminal;
wherein the attribute information of the second terminal comprises first capability information of the second terminal, the first capability information is capability information of the second terminal to communicate with the network device and the first capability information comprises at least one of Packet Data Convergence Protocol (PDCP) layer, Radio Link Control (RLC) layer, or physical layer, radio frequency capability information of the second terminal, and
the processor is configured to:
determine second capability information on the basis of the first capability information, wherein the second capability information is capability information of the second terminal to communicate with the terminal, and the second capability information comprises a maximum receiving bandwidth, a maximum sending bandwidth, a maximum data block size that can be sent, a maximum data block size that can be received, a number of transmit antennas and a number of receive antennas of the second terminal during data transmission with the terminal; and
perform D2D communication with the second terminal on the basis of the second capability information.

10. The terminal according to claim 9, wherein the terminals capable of communicating with the terminal and the terminal are located in a same place, and the place is an office, a home or a school.

11. The terminal according to claim 9, wherein the second terminal comprises multiple terminals; and
the processor is specifically configured to:
send data to the multiple terminals by virtue of a group Identifier (ID) corresponding to the multiple terminals.

* * * * *